(12) United States Patent
Takano et al.

(10) Patent No.: US 9,312,940 B2
(45) Date of Patent: Apr. 12, 2016

(54) COMMUNICATION DEVICE, COMMUNICATION CONTROL METHOD AND COMMUNICATION SYSTEM

(75) Inventors: Hiroaki Takano, Saitama (JP); Yuichi Morioka, Tokyo (JP); Takushi Kunihiro, Tokyo (JP)

(73) Assignee: Sony Corporation, Tokyo (JP)

( * ) Notice: Subject to any disclaimer, the term of this patent is extended or adjusted under 35 U.S.C. 154(b) by 938 days.

(21) Appl. No.: 13/144,419

(22) PCT Filed: Jan. 18, 2010

(86) PCT No.: PCT/JP2010/050492
§ 371 (c)(1),
(2), (4) Date: Jul. 13, 2011

(87) PCT Pub. No.: WO2010/092854
PCT Pub. Date: Aug. 19, 2010

(65) Prior Publication Data
US 2011/0279319 A1 Nov. 17, 2011

(30) Foreign Application Priority Data
Feb. 13, 2009 (JP) ................................. 2009-032028

(51) Int. Cl.
| H04B 7/06 | (2006.01) |
| H04B 7/08 | (2006.01) |
| H04W 16/28 | (2009.01) |

(52) U.S. Cl.
CPC ............ *H04B 7/0619* (2013.01); *H04B 7/0617* (2013.01); *H04B 7/0865* (2013.01); *H04W 16/28* (2013.01)

(58) Field of Classification Search
USPC ................................................. 342/367, 369
IPC ................. H01Q 3/2652; H04B 7/0619; H04W 72/1278, 72/1284, 72/1289
See application file for complete search history.

(56) References Cited

U.S. PATENT DOCUMENTS

| 5,894,598 A | 4/1999 | Shoki |
| 6,507,600 B2 * | 1/2003 | Schilling ....................... 375/134 |

(Continued)

FOREIGN PATENT DOCUMENTS

| JP | 2000-307494 | 11/2000 |
| JP | 2004-515176 | 5/2004 |

(Continued)

OTHER PUBLICATIONS

R. Flickenger et al., Wireless Networking in the Developing World, Second Edition, Hacker Friendly LLC, 2007.*

(Continued)

*Primary Examiner* — Tashiana Adams
*Assistant Examiner* — Fred H Mull
(74) *Attorney, Agent, or Firm* — Paratus Law Group, PLLC

(57) ABSTRACT

To enable high-speed learning of an antenna directionality to be used for millimeter-wave communication, there is provided a communication device including a first radio communication unit capable of radio communication in accordance with a first communication method, and a second radio communication unit capable of radio communication in accordance with a second communication method using a higher frequency band than the first communication method, in which, upon receiving an instruction signal instructing to learn a beam directionality, the first radio communication unit determines a reception start time point of a beam reference signal based on the instruction signal, and the second radio communication unit starts reception of the beam reference signal from the reception start time point determined by the first radio communication unit and determines a parameter value for specifying an optimum beam pattern based on the received beam reference signal.

16 Claims, 11 Drawing Sheets

(56) References Cited

U.S. PATENT DOCUMENTS

| | | | |
|---|---|---|---|
| 2003/0048770 A1* | 3/2003 | Proctor, Jr. | 370/349 |
| 2006/0165155 A1* | 7/2006 | Liu et al. | 375/130 |
| 2007/0037528 A1 | 2/2007 | Doan et al. | |
| 2007/0099669 A1* | 5/2007 | Sadri et al. | 455/562.1 |
| 2008/0026797 A1* | 1/2008 | Nanda et al. | 455/562.1 |
| 2008/0095072 A1 | 4/2008 | Shao et al. | |
| 2009/0160707 A1* | 6/2009 | Lakkis | 342/367 |

FOREIGN PATENT DOCUMENTS

| | | | |
|---|---|---|---|
| JP | 2004-289328 A | * | 10/2004 |
| WO | WO 2007/095354 A2 | | 8/2007 |
| WO | WO 2007/095354 A3 | | 8/2007 |

OTHER PUBLICATIONS

English translation of JP 2004-289328 A.*

M. Galio, The RF and Microwave Handbook, CRC Press LLC, p. 1-1, 2001.*

R. Sorrentino et al., Microwave and RF Engineering, John Wiley & Sons, Ltd, p. 1, 2010.*

Method. (2011). In the American Heritage dictionary of the English language. Retrieved from http://search.credoreference.com/content/entry/hmdictenglang/method/0.*

Microwave. (2011). In the American Heritage dictionary of the English language. Retrieved from http://search.credoreference.com/content/entry/hmdictenglang/microwave/0.*

English-language Abstract of International Patent Application No. PCT/EP2001/013696, filed Nov. 22, 2001.

Nov. 3, 2014, Extended European Search Report for related EP application No. 10741134.0.

Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension, 2008, p. i-192.

* cited by examiner

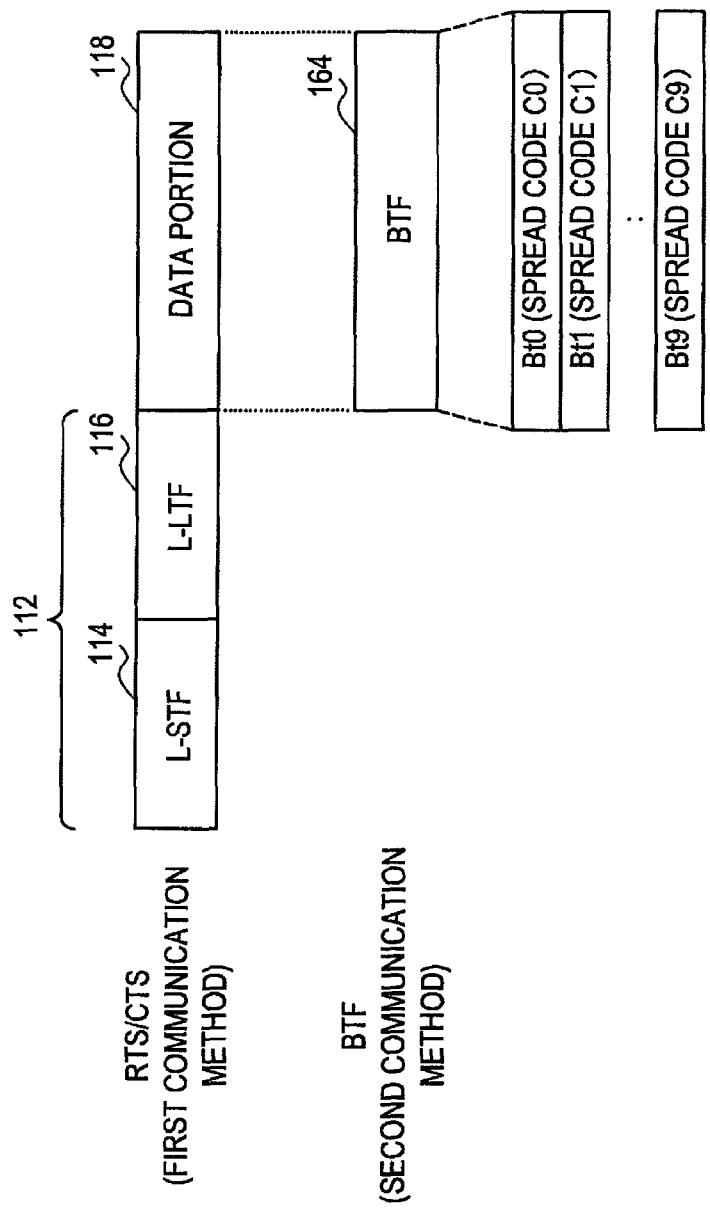

COMMUNICATION DEVICE, COMMUNICATION CONTROL METHOD AND COMMUNICATION SYSTEM

TECHNICAL FIELD

The present invention relates to a communication device, a communication control method and a communication system.

BACKGROUND ART

A new communication method for enhancing the communication speed of radio communication with use of high-frequency electromagnetic waves called millimeter waves is currently under development. The wavelength of millimeter waves is 10 mm to 1 mm and the frequency thereof is 30 GHz to 300 GHz, and assignment of a channel in units of GHz is feasible in a 60-GHz band or the like, for example.

Generally, millimeter waves have characteristics that they propagate more straightly and are attenuated by reflection more significantly compared to microwaves. Therefore, a radio communication path in millimeter-wave communication are mainly direct waves or reflected waves reflected once or so. Further, millimeter waves also have characteristics that a free space propagation loss is large (reachable distance of the electric wave is short). Therefore, while radio communication using millimeter waves has an advantage that space division can be performed easier than the case of using microwaves, there is an aspect that a communication distance is short.

In order to compensate for such a weakness of millimeter waves and make use of high-speed radio communication using millimeter waves in a larger variety of scenes, one approach is to add a directionality to antennas of transmitting and receiving devices and aim a transmitting beam and a receiving beam in the direction where a device at the other end of communication is located to lengthen a communication distance. The directionality of a beam can be controlled by mounting a plurality of antennas on transmitting and receiving devices and assigning different weights to the respective antennas, for example. In the following Patent Literature 1, for example, a technique of performing radio communication with millimeter waves after exchanging a control signal through a communication medium such as sound waves, infrared rays, or light and learning an optimum antenna directionality is disclosed.

CITATION LIST

Patent Literature

Patent Literature 1: JP 2000-307494A

SUMMARY OF INVENTION

Technical Problem

However, the technique of learning an optimum antenna directionality changes an antenna directionality at the transmitting end each time transmitting and receiving one packet and then determines an optimum directionality at the receiving end according to a result of the received packets. In this case, it is necessary to transmit and receive the same number of packets as the number of beam patterns, which increases the time for learning and may cause degradation of the throughput.

In light of the foregoing, the present invention aims to provide a novel and improved communication device, communication control method and communication system that enable high-speed learning of an antenna directionality to be used for millimeter-wave communication.

Solution to Problem

According to an embodiment of the present invention, there is provided a communication device including a first radio communication unit capable of radio communication in accordance with a first communication method, and a second radio communication unit capable of radio communication in accordance with a second communication method using a higher frequency band than the first communication method, wherein upon receiving an instruction signal instructing to learn a beam directionality, the first radio communication unit determines a reception start time point of a beam reference signal based on the instruction signal, and the second radio communication unit starts reception of the beam reference signal from the reception start time point determined by the first radio communication unit and determines a parameter value for specifying an optimum beam pattern based on the received beam reference signal.

It is preferred that the reception start time point is a time point before completion of reception of the instruction signal by the first radio communication unit.

Further, the second radio communication unit may notify the determined parameter value to the first radio communication unit, and the first radio communication unit may transmit a notification signal containing the notified parameter value to a transmission source device of the instruction signal.

Further the second radio communication unit may transmit a notification signal containing the determined parameter value to a transmission source device of the instruction signal.

Further the beam reference signal may be a signal containing plural signal sequences respectively associated with different directionality patterns.

Further, the beam reference signal may be a signal containing plural time slots respectively corresponding to the plural signal sequences, and the parameter may be a parameter for specifying at least one time slot of the plural time slots.

Further, the beam reference signal may be a signal combining the plural signal sequences in orthogonal or pseudo orthogonal relation with one another, and the parameter may be a parameter for specifying at least one signal sequence of the plural signal sequences.

Further, the second radio communication unit may determine an optimum directionality of a receiving beam by varying a directionality of the receiving beam during reception of the beam reference signal.

Further, according to another embodiment of the present invention, there is provided a communication device including a first radio communication unit capable of radio communication in accordance with a first communication method, and a second radio communication unit capable of radio communication in accordance with a second communication method using a higher frequency band than the first communication method, wherein the first radio communication unit transmits an instruction signal instructing to learn a beam directionality to another communication device, and the second radio communication unit transmits a beam reference signal used for learning a beam directionality to said another communication device before completion of transmission of the instruction signal by the first radio communication unit.

Further, according to another embodiment of the present invention, there is provided a communication control method between a transmitting device and a receiving device capable of radio communication in accordance with a first communication method and a second communication method using a higher frequency band than the first communication method, including the steps of: transmitting an instruction signal instructing to learn a beam directionality from the transmitting device to the receiving device in accordance with the first communication method; transmitting a beam reference signal used for learning a beam directionality from the transmitting device to the receiving device in accordance with the second communication method; starting reception of the beam reference signal from a certain reception start time point determined based on the received instruction signal in the receiving device; and determining a parameter for specifying a beam having an optimum directionality based on the received beam reference signal in the receiving device.

Further, according to another embodiment of the present invention, there is provided a communication system including a transmitting device and a receiving device respectively including a first radio communication unit capable of radio communication in accordance with a first communication method, and a second radio communication unit capable of radio communication in accordance with a second communication method using a higher frequency band than the first communication method, wherein the first radio communication unit of the transmitting device transmits an instruction signal instructing to learn a beam directionality to the receiving device, the second radio communication unit of the transmitting device transmits a beam reference signal used for learning a beam directionality to the receiving device, upon receiving the instruction signal, the first radio communication unit of the receiving device determines a reception start time point of the beam reference signal based on the instruction signal, and the second radio communication unit of the receiving device starts reception of the beam reference signal from the determined reception start time point and determines a parameter value for specifying an optimum beam pattern based on the received beam reference signal.

Advantageous Effects of Invention

As described above, a communication device, a communication control method and a communication system according to the present invention enable high-speed learning of an antenna directionality to be used for millimeter-wave communication.

BRIEF DESCRIPTION OF DRAWINGS

FIG. 11 is an explanatory view showing another example of a format of a beam reference signal.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
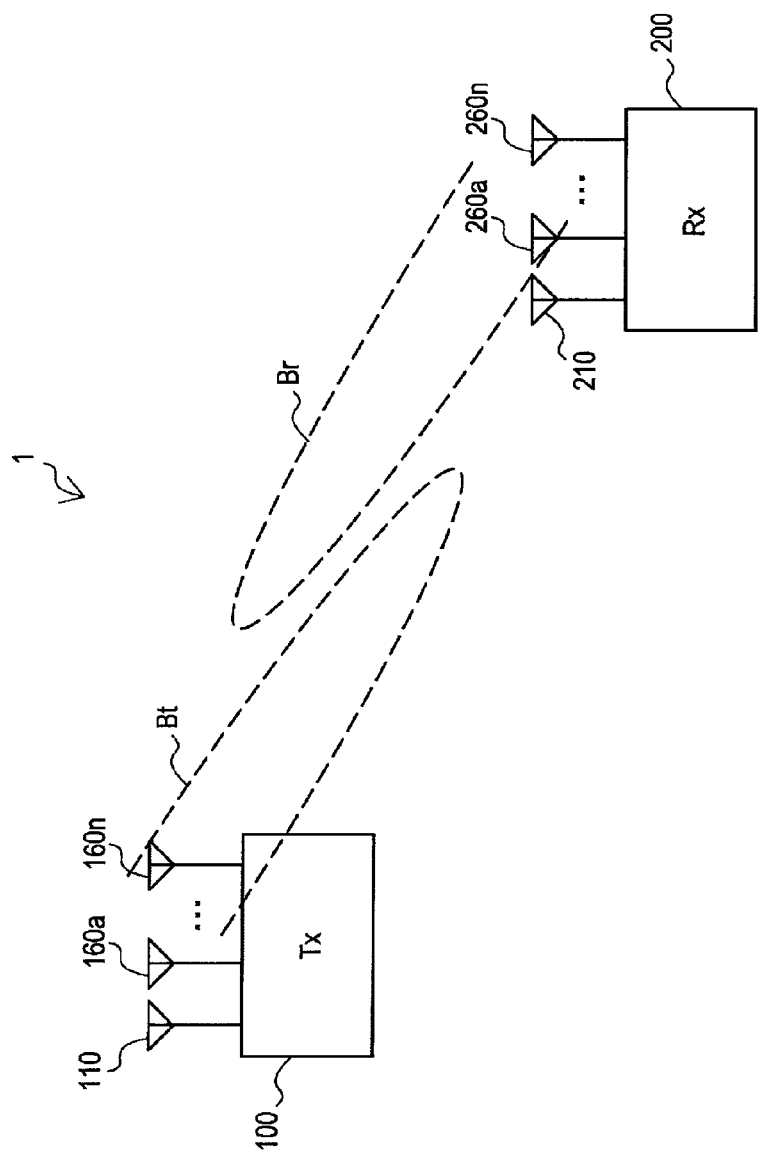
FIG. 1 is a schematic view showing an overview of a communication system according to an embodiment.

Further, "Description of Embodiments" will be provided hereinafter in the following order.
1. Overview of Communication System
2. Configuration Example of Communication Device
2-1. Configuration of Transmitting Device According to an Embodiment
2-2. Configuration of Receiving Device According to an Embodiment
2-3. Example of Signal Transmitting and Receiving Sequence
3. Alternative Example
4. Summary 1. Overview of Communication System FIG. 1 is a schematic view showing an overview of a communication system 1 according to an embodiment of the present invention. Referring to FIG. 1, the communication system 1 includes a communication device 100 and a communication device 200. In this embodiment, the communication device 100 transmits a given signal, which is described later, to the communication device 200 and starts communication with the communication device 200. Further, the communication device 200 receives a signal transmitted from the communication device 100 and starts communication with the communication device 100. Therefore, in this specification, the communication device 100 is referred to as a device at the transmitting end or a transmitting device, and the communication device 200 is referred to as a device at the receiving end or a receiving device, in some cases.

The communication devices 100 and 200 can perform radio communication with each other in accordance with first and second communication methods. Among them, the first communication method is a communication method using electromagnetic waves such as microwaves, for example, that propagate less straightly and are attenuated by reflection less significantly compared to the above-described millimeter waves. The first communication method may be a communication method based on wireless LAN (Local Area Network) standards such as IEEE802.11a/b/g, for example. Thus, when performing radio communication in accordance with the first communication method, the communication devices 100 and 200 can communicate with each other without considering the directionality of a transmitting beam and a receiving beam. On the other hand, the second communication method is a communication method using electromagnetic waves that propagate straightly and are attenuated by reflection significantly, which are typified by the above-described millimeter waves. The second communication method may be a communication method based on VHT (Very High Throughput) standards using a 60-GHz band, for example. Thus, when performing radio communication in accordance with the second communication method, it is preferred that the communication devices 100 and 200 transmit and receive radio signals by pointing a transmitting beam and a receiving beam at the device at the other end of communication.

In the example of FIG. 1, the communication device 100 includes an antenna 110 for transmitting and receiving radio signals in accordance with the first communication method and a plurality of antennas 160a to 160n for transmitting and receiving radio signals in accordance with the second communication method. Further, the communication device 200 includes an antenna 210 for transmitting and receiving radio signals in accordance with the first communication method and a plurality of antennas 260a to 260n for transmitting and receiving radio signals in accordance with the second communication method. The communication devices 100 and 200 can perform so-called MIMO (Multi-Input Multi-Output) communication in accordance with the second communication method by using the plurality of antennas 160a to 160n and the plurality of antennas 260a to 260n. By adjusting weights assigned to signals transmitted and received through the respective antennas, the directionality of transmitting and receiving beams at the time of radio communication in accordance with the second communication method is controlled. Referring to FIG. 1, a transmitting beam Bt is directed from the communication device 100 toward the communication device 200, for example. Further, a receiving beam Br is directed from the communication device 200 toward the communication device 100, for example.

The communication devices 100 and 200 may be a PC (Personal Computer), a terminal device such as a cellular phone terminal, a portable information terminal, a music player or a game terminal, or a household electrical appliance such as a television set, for example. Further, the communication devices 100 and 200 may be network equipment such as a broadband router or a wireless access point. Furthermore, the communication devices 100 and 200 may be a radio communication module or the like incorporated into such equipment.

2. Configuration Example of Communication Device

Examples of configurations of the communication devices 100 and 200 shown in FIG. 1 are described hereinafter with reference to FIGS. 2 to 8.

2-1. Configuration of Transmitting Device According to an Embodiment

Figure 2:
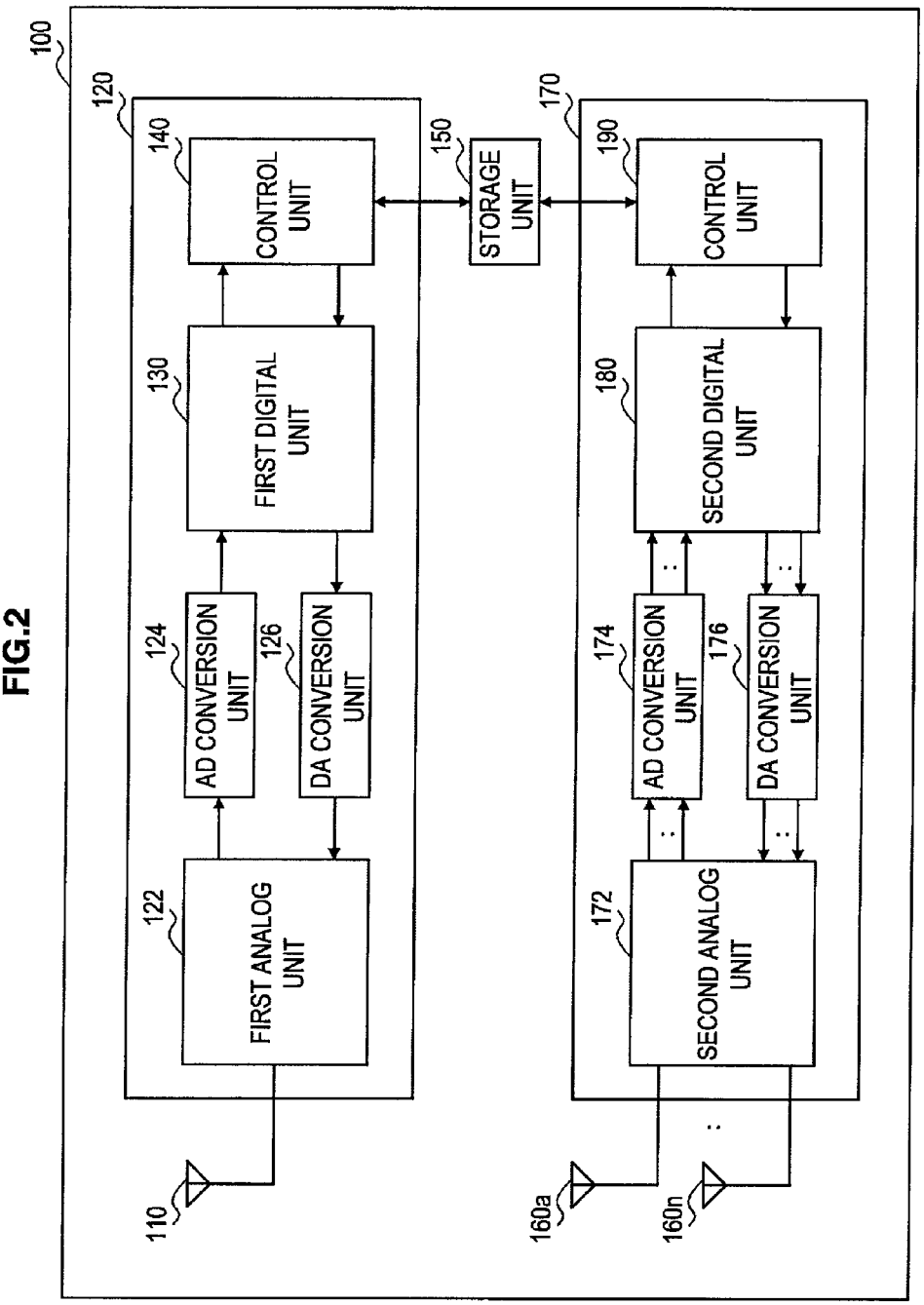
FIG. 2 is a block diagram showing an example of a configuration of a transmitting device according to an embodiment.

FIG. 2 is a block diagram showing an example of a configuration of the communication device 100 according to the embodiment. Referring to FIG. 2, the communication device 100 includes an antenna 110, a first radio communication unit 120, a storage unit 150, a plurality of antennas 160a to 160n and a second radio communication unit 170. The first radio communication unit 120 includes a first analog unit 122, an AD (Analog-to-Digital) conversion unit 124, a DA (Digital-to-Analog) conversion unit 126, a first digital unit 130 and a control unit 140. The second radio communication unit 170 includes a second analog unit 172, an AD conversion unit 174, a DA conversion unit 176, a second digital unit 180 and a control unit 190.

The antenna 110 is an antenna that is used for radio communication in accordance with the first communication method. The antenna 110 transmits an instruction signal which instructs to learn a beam directionality by using microwaves, for example. Further, the antenna 110 receives a notification signal to obtain notification of an optimum beam pattern and outputs it to the first analog unit 122, for example.

The first analog unit 122 typically corresponds to an RF (Radio Frequency) circuit for transmitting and receiving a radio signal in accordance with the first communication method. Specifically, the first analog unit 122 performs amplification and frequency conversion of a received signal received by the antenna 110 and outputs it to the AD conversion unit 124, for example. Further, the first analog unit 122 performs frequency conversion of a transmission signal converted into an analog signal by the DA conversion unit 126 and outputs it to the antenna 110.

The AD conversion unit 124 converts a received signal, which is an analog signal, input from the first analog unit 122 into a digital signal and outputs it to the first digital unit 130. The DA conversion unit 126 converts a transmission signal, which is a digital signal, input from the first digital unit 130 into an analog signal and outputs it to the first analog unit 122.

The first digital unit 130 typically includes a circuit for demodulating and decoding a received signal in accordance with the first communication method and a circuit for encoding and modulating a transmission signal in accordance with the first communication method. If the instruction signal which instructs to learn a beam directionality is input from the control unit 140, the first digital unit 130 encodes and modulates the instruction signal and outputs it to the DA conversion unit 126, for example. Further, if the above-described notification signal is input from the AD conversion unit 124, the first digital unit 130 demodulates and decodes the notification signal and outputs it to the control unit 140, for example.

The control unit 140 controls the overall operation of the first radio communication unit 120 by using an arithmetic unit such as a CPU (Central Processing Unit), for example. The control unit 140 outputs the above-described instruction signal to the first digital unit 130 in response to a request from a given application, for example. Further, if a decoded notification signal is input from the first digital unit 130, the control unit 140 acquires a parameter value for specifying an optimum beam pattern contained in the notification signal and stores it into the storage unit 150.

The storage unit 150 stores a program, a parameter value and the like to be used for communication processing by the communication device 100 by using a recording medium such as semiconductor memory, for example. For example, in this embodiment, the storage unit 150 may store a parameter value for specifying an optimum beam pattern at the time of radio communication by the second radio communication unit 170 in accordance with the second communication method.

The plurality of antennas 160a to 160n are antennas to be used for radio communication in accordance with the second communication method. The plurality of antennas 160a to 160n are typically configured as MIMO antennas. Specifically, the antennas 160a to 160n transmit radio signals which are weighted with prescribed weighting factors by using millimeter waves, for example. Further, the antennas 160a to 160n receive radio signals, which are millimeter waves, and output them to the second analog unit 172, for example.

The second analog unit 172 typically corresponds to an RF circuit for transmitting and receiving radio signals in accordance with the second communication method. Specifically, the second analog unit 172 performs amplification and frequency conversion of a plurality of received signals respectively received by the antennas 160a to 160n and outputs them to the AD conversion unit 174, for example. Further, the second analog unit 172 performs frequency conversion of a plurality of transmission signals respectively converted into analog signals by the DA conversion unit 176 and outputs them to the antennas 160a to 160n.

The AD conversion unit 174 converts a plurality of received signals, which are analog signals, input from the second analog unit 172 into digital signals and outputs them to the second digital unit 180. The DA conversion unit 176 converts a plurality of transmission signals, which are digital signals, input from the second digital unit 180 into analog signals and outputs them to the second analog unit 172.

The second digital unit 180 typically includes a circuit for demodulating and decoding received signals in accordance with the second communication method, and a circuit for encoding and modulating transmission signals in accordance with the second communication method.

Figure 3:
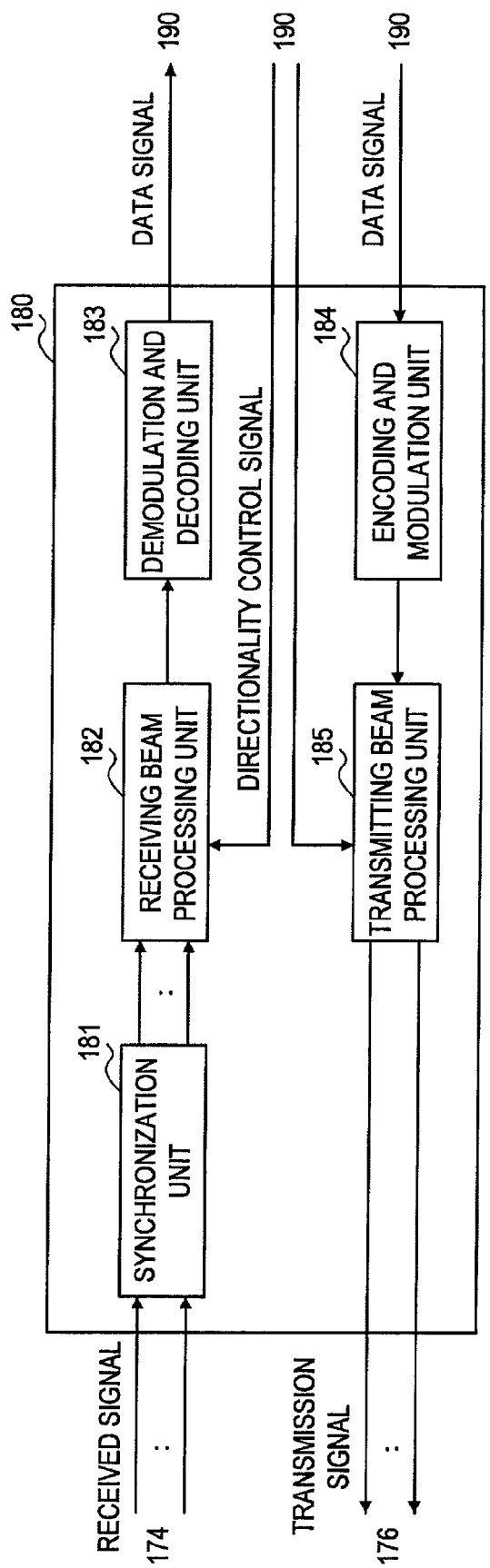
FIG. 3 is a block diagram showing an example of a specific configuration of a second digital unit in a transmitting device according to an embodiment.

FIG. 3 is a block diagram showing an example of a specific configuration of the second digital unit 180. Referring to FIG. 3, the second digital unit 180 includes a synchronization unit 181, a receiving beam processing unit 182, a demodulation and decoding unit 183, an encoding and modulation unit 184, and a transmitting beam processing unit 185.

The synchronization unit 181 synchronizes the start timing of reception processing on a plurality of received signals received by the plurality of antennas 160a to 160n according to a preamble at the head of a packet, for example, and outputs the signals to the receiving beam processing unit 182.

The receiving beam processing unit 182 performs weighting processing of the plurality of received signals input from the synchronization unit 181 according to uniform distribution or Taylor distribution, for example, and thereby controls the directionality of a receiving beam. The values of the weights used by the receiving beam processing unit 182 are specified by a directionality control signal input from the control unit 190, for example. Alternatively, the receiving beam processing unit 182 may produce a receiving beam by treating the plurality of antennas 160a to 160n as an array antenna.

The demodulation and decoding unit 183 demodulates and decodes the received signals weighted by the receiving beam processing unit 182 according to arbitrary modulation method and encoding method used in the second communication method and acquires a data signal. The demodulation and decoding unit 183 then outputs the acquired data signal to the control unit 190.

The encoding and modulation unit 184 encodes and modulates a data signal input from the control unit 190 according to arbitrary encoding method and modulation method used in the second communication method and generates a transmission signal. The encoding and modulation unit 184 then outputs the generated transmission signal to the transmitting beam processing unit 185.

The transmitting beam processing unit 185 generates a plurality of transmission signals weighted according to uniform distribution or Taylor distribution, for example, from a transmission signal input from the encoding and modulation unit 184 and thereby controls the directionality of a transmitting beam. The values of the weights used by the transmitting beam processing unit 185 are specified by a directionality control signal input from the control unit 190, for example. Alternatively, the transmitting beam processing unit 185 may produce a transmitting beam by treating the plurality of antennas 160a to 160n as an array antenna. The plurality of transmission signals weighted by the transmitting beam processing unit 185 are respectively output to the DA conversion unit 176.

Although not shown in FIG. 3, the second digital unit 180 may further estimate channel characteristics of MIMO channels from the received signals received by the plurality of antennas 160a to 160n and perform channel equalization according to the estimation result.

Referring back to FIG. 2, an example of a configuration of the communication device 100 is further described.

The control unit 190 controls the overall operation of the second radio communication unit 170 by using an arithmetic unit such as a CPU, for example. For example, in response to a request from a given application, the control unit 190 makes a beam reference signal transmitted from the second radio communication unit 170 after the lapse of a specified time from the transmission of the above-described instruction signal from the first radio communication unit 120. Further, for example, the control unit 190 acquires a parameter value for specifying an optimum beam pattern from the storage unit 150 and outputs a directionality control signal that contains the acquired parameter value to the receiving beam processing unit 182 or the transmitting beam processing unit 185 of the second digital unit 180 described above. A receiving beam or a transmitting beam at the time of radio communication in accordance with the second communication method by the communication device 100 is thereby directed in the direction where the device at the other end of communication is located.

Figure 4:
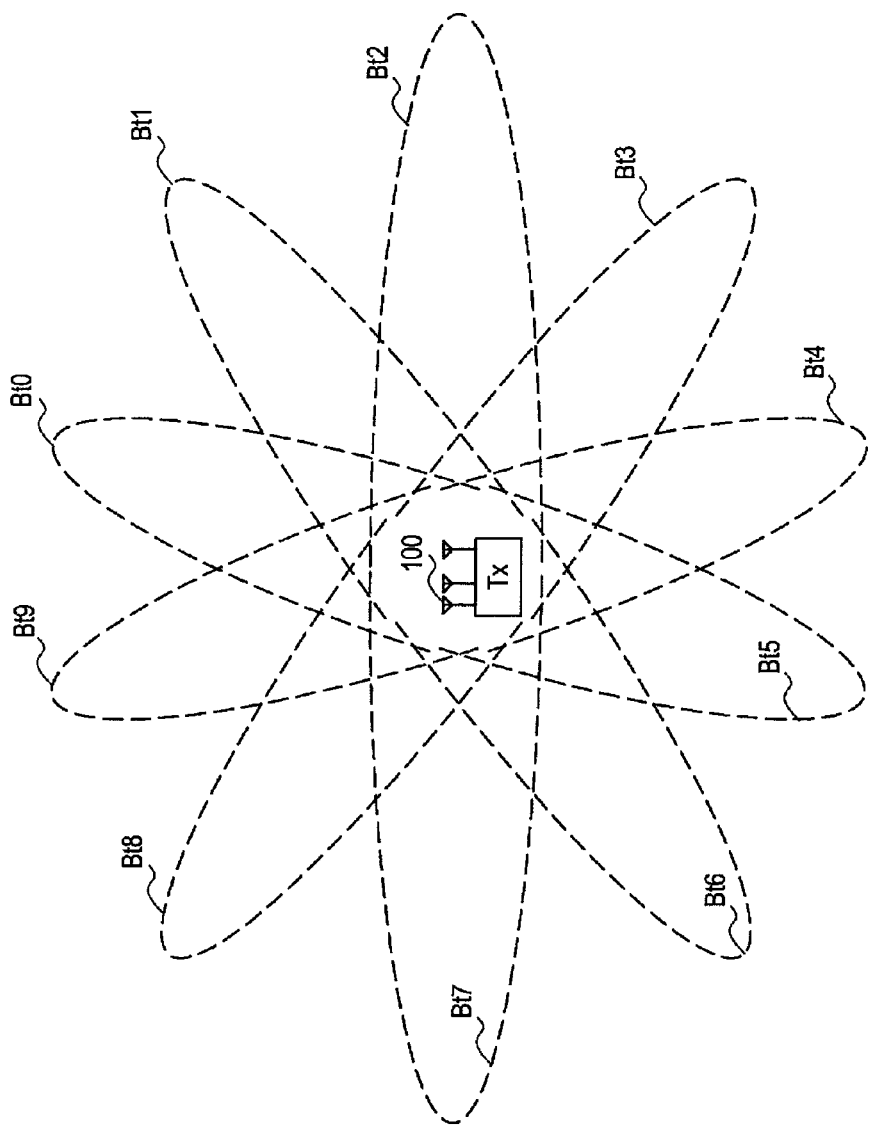
FIG. 4 is an explanatory view showing an example of beam patterns.

FIG. 4 is an explanatory view showing an example of beam patterns which can be created in the communication device 100.

Referring to FIG. 4, ten transmitting beam patterns Bt0 to Bt9 are shown which can be created in the communication device 100 according to the present embodiment. The transmitting beam patterns Bt0 to Bt9 respectively have directionalities in directions differing by 36 degrees each on a plane where the communication device 100 is located. The transmitting beam processing unit 185 of the communication device 100 can transmit radio signals from the antennas 160a to 160n by using a transmitting beam pattern selected from the ten transmitting beam patterns Bt0 to Bt9 according to the directionality control signal from the control unit 190. Further, receiving beam patterns which can be created in the communication device 100 may be beam patterns similar to the transmitting beam patterns Bt0 to Bt9 shown in FIG. 4. In the storage unit 150 of the communication device 100, weighting factors for the antennas 160a to 160n to create those beam patterns, for example, are prestored. It should be noted that the transmitting beam patterns and the receiving beam patterns which can be created in the communication device 100 are not limited such examples. For example, the transmitting beam patterns or the receiving beam patterns having directionalities in various directions on a three-dimensional space may be created.

Figure 5:
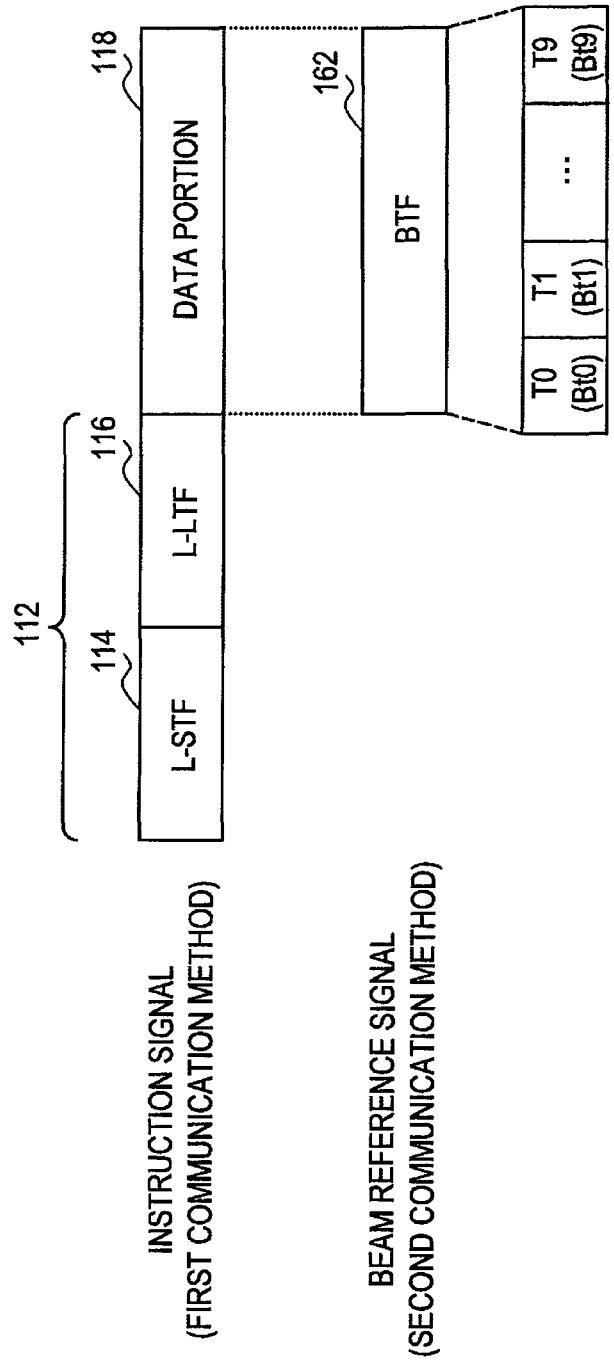
FIG. 5 is an explanatory view showing an example of formats of an instruction signal and a beam reference signal.

FIG. 5 is an explanatory view showing an example of signal formats of the instruction signal and the beam reference signal transmitted from the communication device 100.

Referring to FIG. 5, the instruction signal transmitted from the antenna 110 in accordance with the first communication method contains a header portion 112 and a data portion 118. Further, the header portion 112 has L-STF (Legacy-Short Training Field) 114 and L-LTF (Legacy-Long Training Field) 116, for example. The L-STF 114 principally serves as a preamble and can be used for packet detection, automatic gain control and synchronization processing at the receiving end. The L-LTF 116 is principally used for channel estimation and frequency offset correction. Arbitrary data is stored in the data portion 118.

On the other hand, the beam reference signal transmitted from the antennas 160a to 160n has BTF (Beam Training Field) 162. The BTF 162 is transmitted from the antennas 160a to 160n in synchronization with the transmission of the data portion 118 of the above-described instruction signal from the antenna 110, according to control by the control unit 190.

In this embodiment, the BTF 162 is composed of ten time slots T0 to T9 respectively corresponding to the transmitting beam patterns Bt0 to Bt9 shown in FIG. 4. In each time slots T0 to T9, a known signal sequence used for learning of a beam at the receiving end is weighted with weighting factors for creating the corresponding transmitting beam patterns Bt0 to Bt9, respectively. Specifically, the directionality of the transmitting beam of the beam reference signal is sequentially changed in the respective time slots T0 to T9. Accordingly, in a receiving device located in the vicinity of the communication device 100, a power level of a received signal has an outstanding value in any time slot of the beam reference signal according to the location, so that an optimum transmitting beam pattern can be determined. Note that the known signal sequence may be a random pattern of BPSK (Binary Phase Shift Keying), for example.

As the instruction signal shown in FIG. 5, RTS (Request To Send) or CTS (Clear To Send) based on standard specification such as IEEE802.11a/b/g may be used, for example. A transmitting and receiving sequence of a signal in which RTS or CTS is the instruction signal is described in further detail later.

A configuration of the communication device 200 that receives the instruction signal and the beam reference signal transmitted in the above manner is described hereinafter.

2-2. Configuration of Receiving Device According to an Embodiment

Figure 6:
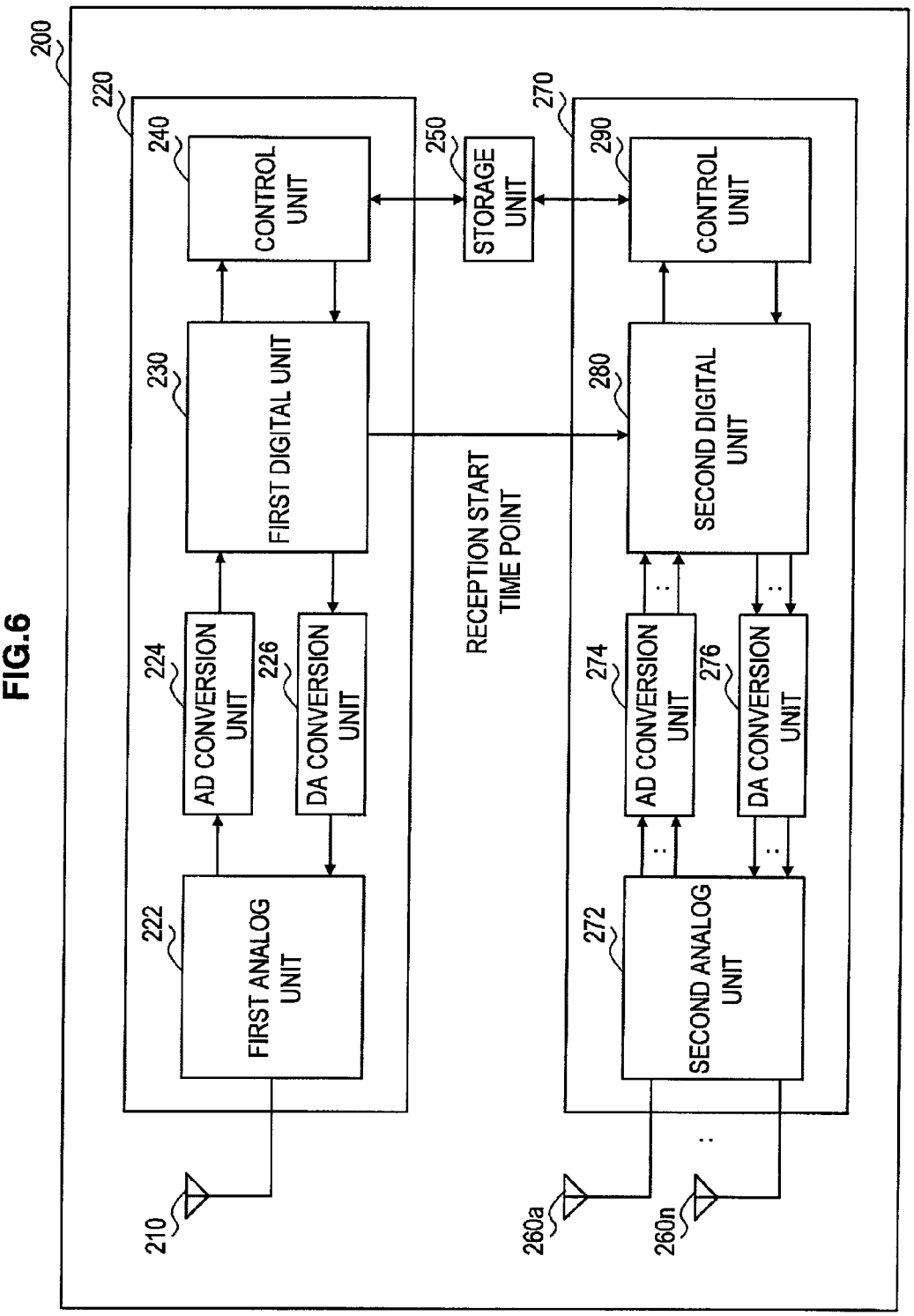
FIG. 6 is a block diagram showing an example of a configuration of a receiving device according to an embodiment.

FIG. 6 is a block diagram showing an example of a configuration of the communication device 200 according to the embodiment. Referring to FIG. 6, the communication device 200 includes the antenna 210, a first radio communication unit 220, a storage unit 250, a plurality of antennas 260a to 260n and a second radio communication unit 270. Further, the first radio communication unit 220 includes a first analog unit 222, an AD conversion unit 224, a DA conversion unit 226, a first digital unit 230 and a control unit 240. The second radio communication unit 270 includes a second analog unit 272, an AD conversion unit 274, a DA conversion unit 276, a second digital unit 280 and a control unit 290.

The antenna 210 is an antenna that is used for radio communication in accordance with the first communication method. The antenna 210 receives the above-described instruction signal that is transmitted from the communication device 100, for example. Further, the antenna 210 transmits a notification signal for giving notification of an optimum beam pattern that is determined by processing which is described later, for example.

The first analog unit 222 typically corresponds to an RF circuit for transmitting and receiving a radio signal in accordance with the first communication method. Specifically, the first analog unit 222 performs amplification and frequency conversion of a received signal received by the antenna 210 and outputs it to the AD conversion unit 224, for example. Further, the first analog unit 222 performs frequency conversion of a transmission signal converted into an analog signal by the DA conversion unit 226 and outputs it to the antenna 210.

The AD conversion unit 224 converts a received signal, which is an analog signal, input from the first analog unit 222 into a digital signal and outputs it to the first digital unit 230. The DA conversion unit 226 converts a transmission signal, which is a digital signal, input from the first digital unit 230 into an analog signal and outputs it to the first analog unit 222.

The first digital unit 230 typically includes a circuit for demodulating and decoding a received signal in accordance with the first communication method, and a circuit for encoding and modulating a transmission signal in accordance with the first communication method. Further, in this embodiment, if the above-described instruction signal is input, the first digital unit 230 acquires synchronization by using the header portion 112 of the instruction signal shown in FIG. 5 and notifies a reception start time point at which reception of the beam reference signal is to be started to the second digital unit 280 of the second radio communication unit 270. For example, it is assumed that a time interval from a given position (e.g. at the head of the L-STF 114, at the head of the L-LTF 116 or at the end of the L-LTF 116 etc.) of the header portion 112 of the instruction signal to the head of the beam reference signal is prescribed in advance between a transmitting device and a receiving device. In such a case, the first digital unit 230 can determine a time point at which the time interval has elapsed from the time point at which the given position of the header portion 112 of the instruction signal is detected as the reception start time point. Alternatively, for example, data that designates a specific reception start time point may be contained in the header portion 112 of the instruction signal in a transmitting device. In such a case, the first digital unit 230 can acquire the data that designates the reception start time point from the header portion 112 of the instruction signal and determine the reception start time point based on the data. Reception processing of the beam reference signal in the second digital unit 280 is described in further detail later. Then, if a notification signal for notifying the optimum beam pattern determined using the beam reference signal is input from the control unit 240, the first digital unit 230 encodes and modulates the notification signal and outputs it to the DA conversion unit 226, for example.

The control unit 240 controls the overall operation of the first radio communication unit 220 by using an arithmetic unit such as a CPU, for example. Further, if the optimum beam pattern is determined by the second radio communication unit 270, which is described later, the control unit 240 acquires a parameter value that specifies the determined optimum beam pattern from the storage unit 250, adds the parameter value to the above-described notification signal and outputs the signal to the first digital unit 230.

The storage unit 250 stores a program, a parameter value and the like to be used for communication processing by the communication device 200 by using a recording medium such as semiconductor memory, for example. For example, in this embodiment, the storage unit 250 may store a parameter value for specifying an optimum beam pattern at the time of radio communication by the second radio communication unit 270 in accordance with the second communication method. Further, the storage unit 250 stores a parameter value for specifying an optimum beam pattern at the transmitting end that is determined by the second radio communication unit 270, which is described later, for example.

The plurality of antennas 260a to 260n are antennas to be used for radio communication in accordance with the second communication method. The plurality of antennas 260a to 260n are typically configured as MIMO antennas. Specifically, the antennas 260a to 260n transmit radio signals which are weighted with prescribed weighting factors by using millimeter waves, for example. Further, the antennas 260a to 260n receive radio signals, which are millimeter waves, and output them to the second analog unit 272, for example.

The second analog unit 272 typically corresponds to an RF circuit for transmitting and receiving radio signals in accordance with the second communication method. Specifically, the second analog unit 272 performs amplification and frequency conversion of a plurality of received signals respectively received by the antennas 260a to 260n and outputs them to the AD conversion unit 274, for example. Further, the second analog unit 272 performs frequency conversion of a plurality of transmission signals respectively converted into analog signals by the DA conversion unit 276 and outputs them to the antennas 260a to 260n.

The AD conversion unit 274 converts a plurality of received signals, which are analog signals, input from the second analog unit 272 into digital signals and outputs them to the second digital unit 280. The DA conversion unit 276 converts a plurality of transmission signals, which are digital signals, input from the second digital unit 280 into analog signals and outputs them to the second analog unit 272.

The second digital unit 280 typically includes a circuit for demodulating and decoding received signals in accordance with the second communication method, and a circuit for encoding and modulating transmission signals in accordance with the second communication method.

Figure 7:
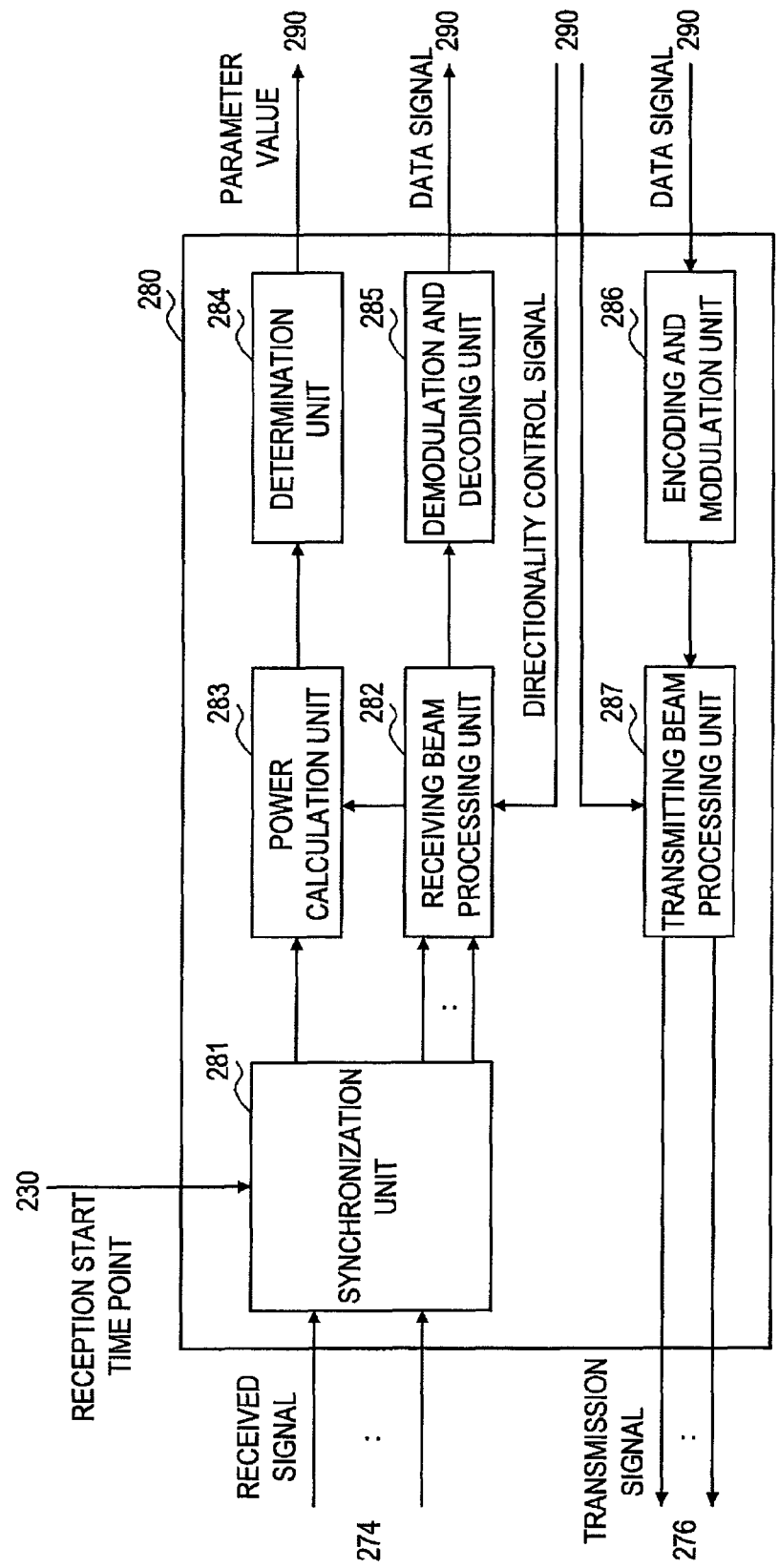
FIG. 7 is a block diagram showing an example of a more specific configuration of a second digital unit in a receiving device according to an embodiment.

FIG. 7 is a block diagram showing an example of a specific configuration of the second digital unit 280. Referring to FIG. 7, the second digital unit 280 includes a synchronization unit 281, a receiving beam processing unit 282, a power calculation unit 283, a determination unit 284, a demodulation and decoding unit 285, an encoding and modulation unit 286 and a transmitting beam processing unit 287.

The synchronization unit 281 synchronizes the start timing of reception processing on a plurality of received signals received by the plurality of antennas 260a to 260n according to a preamble at the head of a packet, for example, and outputs the signals to the receiving beam processing unit 282. Further, if the reception start time point of the beam reference signal is notified from the first digital unit 230 of the first radio communication unit 220 described above, the synchronization unit 281 starts reception of the beam reference signal illustrated in FIG. 5 from the reception start time point. Then, the synchronization unit 281 outputs the received beam reference signal to the receiving beam processing unit 282 and instructs calculation of a received power to the power calculation unit 283.

The receiving beam processing unit 282, like the receiving beam processing unit 182 described above, performs weighting processing of the plurality of received signals input from the synchronization unit 281 according to uniform distribution or Taylor distribution, for example, and thereby controls the directionality of a receiving beam. The receiving beam processing unit 282 then outputs the weighted received signal to the power calculation unit 283 and the demodulation and decoding unit 285.

Figure 8:
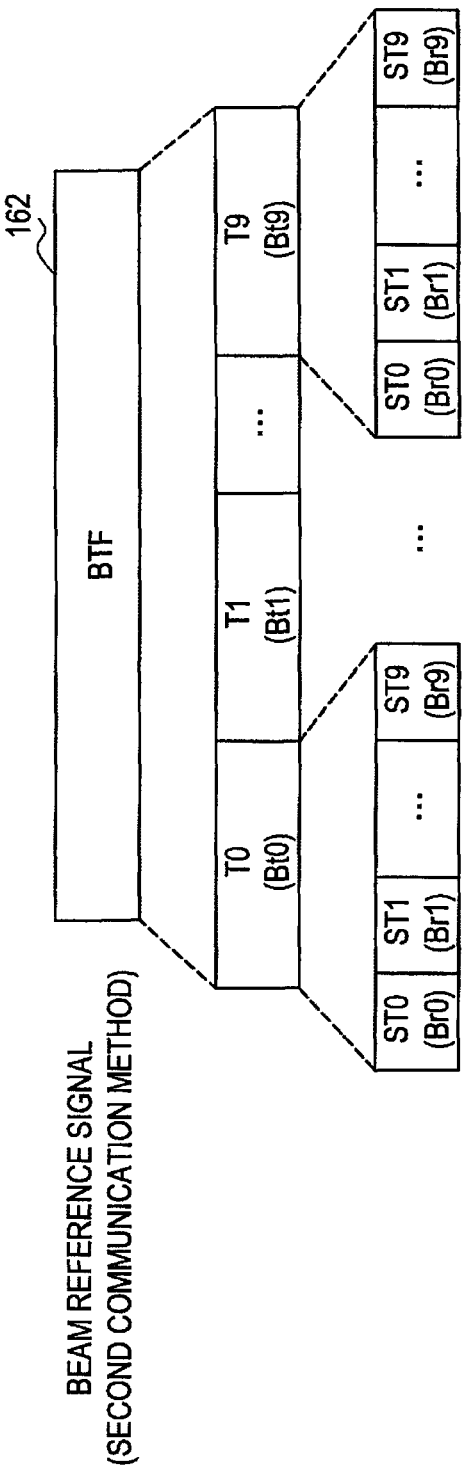
FIG. 8 is an explanatory view to describe directionality control processing according to an embodiment.

FIG. 8 is an explanatory view to describe directionality control processing of a receiving beam by the receiving beam processing unit 282.

Referring to FIG. 8, an example of the signal format of the beam reference signal that is transmitted from the communication device 100 in accordance with the second communication method is shown. The beam reference signal contains the BTF 162 composed of ten time slots T0 to T9 respectively corresponding to the transmitting beam patterns Bt0 to Bt9. The receiving beam processing unit 282 further divides each of the time slots T0 to T9 of the beam reference signal into ten sections ST0 to ST9 and performs weighting processing of the received signals with ten receiving beam patterns which are different from one another in the respective sections ST0 to ST9. For example, the first section ST0 of the time slot T0 is associated with the receiving beam pattern Br0, and the second section ST1 of the time slot T0 is associated with the receiving beam pattern Br1 or the like. As a result of such directionality control processing, received signals transmitted and received with total 100 transmitting and receiving beam patterns (10 transmitting beam patterns×10 receiving beam patterns) can be obtained in one beam reference signal.

The power calculation unit 283 shown in FIG. 7 calculates received powers of the respective received signals transmitted and received with the above-described total 100 transmitting and receiving beam patterns in response to an instruction from the synchronization unit 281. Then, the power calculation unit 283 sequentially outputs the calculated received power values to the determination unit 284.

The determination unit 284 determines a parameter value for specifying the optimum transmitting beam pattern and receiving beam pattern based on the received power values input from the power calculation unit 283. The optimum beam pattern is typically a beam pattern with which a series of received power values input from the power calculation unit 283 for one beam reference signal has a maximum value. The parameter value for specifying the optimum transmitting beam pattern may be any time slot number (T0 to T9) of the BTF 162 shown in FIG. 5 and FIG. 8, for example. Alternatively, the parameter value for specifying the optimum transmitting beam pattern may be a weighting factor to be multiplied with a transmission signal by the transmitting beam processing unit 287, for example. Further, the parameter value for specifying the optimum receiving beam pattern may be a section number (ST0 to ST9) shown in FIG. 8, for example. Alternatively, the parameter value for specifying the optimum receiving beam pattern may be weighting factors to be respectively multiplied with a plurality of received signals by the receiving beam processing unit 282, for example. The determination unit 284 outputs the parameter values determined in this manner to the control unit 290.

The demodulation and decoding unit 285 demodulates and decodes the received signal weighted by the receiving beam processing unit 282 according to arbitrary modulation method and encoding method used in the second communication method and acquires a data signal. The demodulation and decoding unit 285 then outputs the acquired data signal to the control unit 290.

The encoding and modulation unit 286 encodes and modulates the data signal input from the control unit 290 according to arbitrary encoding method and modulation method used in the second communication method and generates a transmission signal. The encoding and modulation unit 286 then outputs the generated transmission signal to the transmitting beam processing unit 287.

The transmitting beam processing unit 287, like the transmitting beam processing unit 185 described above, generates a plurality of transmission signals weighted according to uniform distribution or Taylor distribution, for example, from the transmission signal input from the encoding and modulation unit 286 and thereby controls the directionality of a transmitting beam. The values of the weights used by the transmitting beam processing unit 287 are specified by a directionality control signal input from the control unit 290, for example. The plurality of transmission signals weighted by the transmitting beam processing unit 287 is respectively output to the DA conversion unit 276.

Although not shown in FIG. 7, the second digital unit 280 may further estimate channel characteristics of MIMO channels from the received signals received by the plurality of antennas 260a to 260n and perform channel equalization according to the estimation result.

Referring back to FIG. 6, an example of a configuration of the communication device 200 is further described.

The control unit 290 controls the overall operation of the second radio communication unit 270 by using an arithmetic unit such as a CPU, for example. Further, if the beam reference signal is received by the second radio communication unit 270, the control unit 290 stores a parameter value for specifying an optimum transmitting beam pattern output from the second digital unit 280 into the storage unit 250. The stored parameter value is notified using a notification signal to a transmission source device of the beam reference signal (e.g. the communication device 100) by the first radio communication unit 220. Further, the control unit 290 outputs a directionality control signal that contains a parameter value for specifying an optimum receiving beam pattern output from the second digital unit 280 to the receiving beam processing unit 282 so as to produce a receiving beam having a directionality in the direction of the device at the other end of communication. Further, the control unit 290 may output a directionality control signal that contains the same parameter value as the value used for producing the receiving beam to the transmitting beam processing unit 287 so as to produce a transmitting beam having a directionality in the same direction. It is thereby possible to perform radio communication between the communication device 100 and the communication device 200 in accordance with the second communication method with their directionalities oriented toward the other device, for example.

Note that, instead of notifying the above-described parameter value from the second radio communication unit 270 to the first radio communication unit 220 through the storage unit 250, the parameter value may be notified from the second radio communication unit 270 to the first radio communication unit 220 by using a dedicated signal line, for example.

2-3. Example of Signal Transmitting and Receiving Sequence

Figure 9:
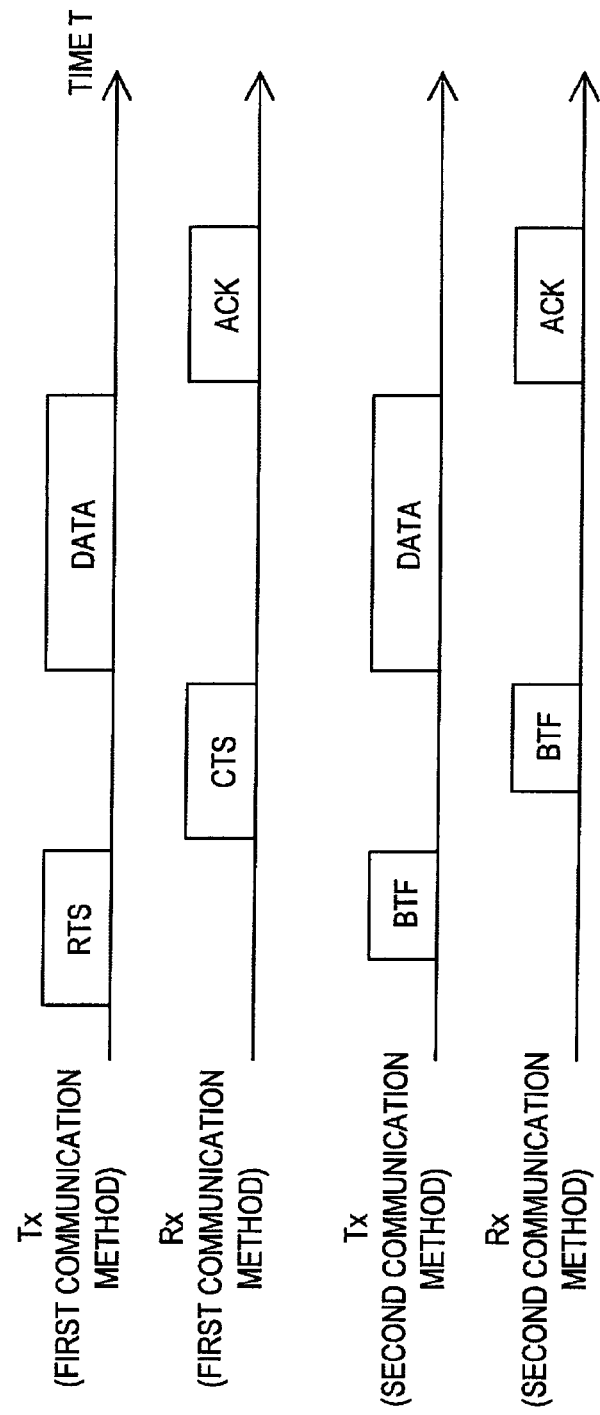
FIG. 9 is an explanatory view showing an example of a signal transmitting and receiving sequence according to an embodiment.

FIG. 9 is an explanatory view showing an example of a sequence of signals transmitted and received between the communication device 100 and the communication device 200 described above. Referring to FIG. 9, signals transmitted from the communication device 100 (Tx) and the communication device 200 (Rx) are sequentially shown along the time axis.

First, RTS in accordance with the first communication method is transmitted from the first radio communication unit 120 of the communication device 100. Further, in parallel with the transmission of the RTS, BTF in accordance with the second communication method is transmitted from the second radio communication unit 170 of the communication device 100. The RTS corresponds to the above-described instruction signal, and the BTF corresponds to the above-described beam reference signal. An optimum transmitting beam pattern and an optimum receiving beam pattern in the case of transmitting a signal from the communication device 100 to the communication device 200 is thereby determined in the communication device 200.

Next, CTS in accordance with the first communication method is transmitted from the first radio communication unit 220 of the communication device 200. The data portion of the CTS contains a parameter value that specifies an optimum transmitting beam pattern, for example. In this case, the CTS corresponds to the above-described notification signal. The communication device 100 can be thereby notified about the optimum transmitting beam pattern when transmitting a signal to the communication device 200. Further, the CTS transmitted from the communication device 200 to the communication device 100 may also serve as the above-described instruction signal. Specifically, an optimum receiving beam pattern may be determined in the communication device 100 by transmitting BTF in accordance with the second communication method from the second radio communication unit 270 of the communication device 200 in parallel with the transmission of the CTS.

After that, data is transmitted from the communication device 100 to the communication device 200, and ACK (acknowledgement) is transmitted back from the communication device 200 to the communication device 100. At this time, because the optimum transmitting and receiving beam patterns determined by learning are used between the communication device 100 and the communication device 200, it is possible to transmit and receive data more reliably in accordance with the second communication method even with use of millimeter waves with high straightness and short electric wave attainment distance.

3. Alternative Example

Figure 10:
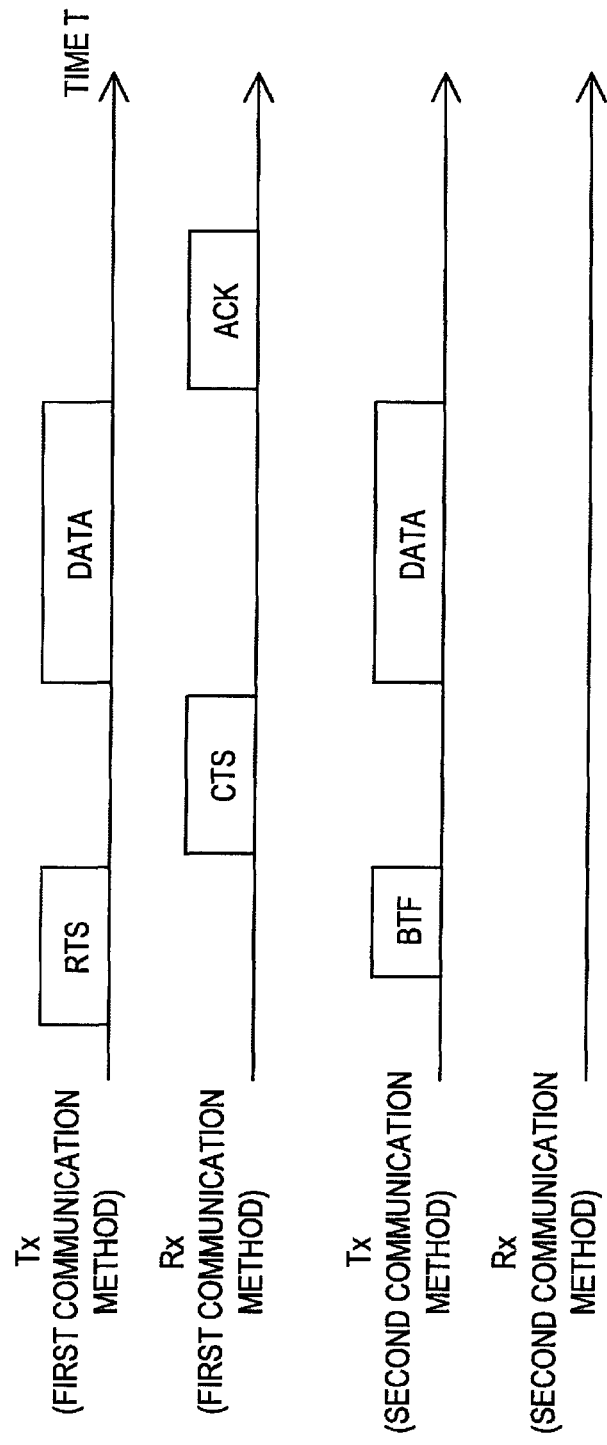
FIG. 10 is an explanatory view showing another example of a signal transmitting and receiving sequence according to an embodiment.

FIG. 10 is an explanatory view showing another example of a sequence of signals transmitted and received between the communication device 100 and the communication device 200.

In the example of FIG. 10, first, RTS, which is the instruction signal, and BTF, which is the beam reference signal, are transmitted from the communication device 100 to the communication device 200, just like in the example of FIG. 9. Next, optimum transmitting and receiving beam patterns are determined in the communication device 200, and CTS, which is the notification signal, is transmitted from the communication device 200 to the communication device 100. At this time, BTF is not transmitted from the communication device 200. After that, data is transmitted from the communication device 100 to the communication device 200, and ACK in accordance with the first communication method is transmitted back from the communication device 200 to the communication device 100. Note that, although an example in which CTS, which is the notification signal, is transmitted from the communication device 200 to the communication device 100 in accordance with the first communication method is shown here, CTS, which is the notification signal, may be transmitted in accordance with the second communication method. In this case, in the second radio communication unit 270 of the communication device 200, transmitting beam patterns having the same directionality as receiving beam patterns that are learned based on RTS may be used for transmission of CTS.

FIG. 11 is an explanatory view showing another example of the signal format of the beam reference signal.

Referring to FIG. 11, the beam reference signal contains BTF 164. The BTF 164 is a signal that combines a plurality of signal sequences in orthogonal or pseudo orthogonal relation with one another, which have different directionality patterns. For instance, in the example of FIG. 11, the BTF 164 is a signal that combines ten different signal sequences which are respectively spread by using spread codes C0 to C9 and respectively correspond to the transmitting beam patterns Bt0 to Bt9. With use of the spread codes C0 to C9 that establish the orthogonal or pseudo orthogonal relation, even if signal sequences associated with the transmitting beam patterns Bt0 to Bt9 are combined at the transmitting end, each signal sequence can be extracted from a composite signal at the receiving end. It is thereby possible to calculate a received power for each extracted signal sequence and determine an optimum transmitting beam pattern with which the received power is maximum. In this case, a parameter for specifying a transmitting beam pattern may be a spread code that specifies at least one signal sequence of the above-described signal sequences, an identifier of a signal sequence or the like, for example. The BTF 164, like the BTF 162 shown in FIG. 5, is transmitted in accordance with the second communication method in synchronization with the transmission of the data portion 118 of the instruction signal. By using such an alternative example, it is possible to shorten the data length of the beam reference signal compared to the case of using the same number of time slots as the number of beam patterns.

4. Summary

The configuration and its alternative example of the communication devices 100 and 200 according to an embodiment of the present invention are described above with reference to FIGS. 1 to 11. According to the present embodiment, the reception start time point of the beam reference signal that is transmitted in accordance with the second communication method (e.g. using millimeter waves etc.) is determined based on the instruction signal that is transmitted in accordance with the first communication method (e.g. using microwaves or the like etc.). Because the beam reference signal is transmitted in the time that overlaps with the transmission of the data portion of the instruction signal, the reception start time point is a time point prior to completion of reception of the instruction signal. Then, based on the beam reference signal received from the reception start time point, a parameter value for specifying an optimum beam pattern is determined. It is thereby possible to learn optimum directionalities of transmitting and receiving beams used for radio communication in accordance with the second communication method during transmission and reception of one packet (e.g. RTS, CTS etc.).

It should be noted that, although a case where the communication device 100 is a transmitting device and the communication device 200 is a receiving device is described in this specification, a communication device that incorporates the functions of both the communication device 100 and the communication device 200 may be configured as a matter of course.

Further, in this specification, the case where a beam pattern with which a received power is maximum is determined as an optimum beam pattern in the communication device 200 is described. Alternatively, however, a plurality of beam patterns with high received powers may be determined as candidates of a beam pattern to be used in the communication device 200. Radio communication using millimeter waves can be thereby performed by the combined use of a plurality of beam patterns, for example.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 COMMUNICATION SYSTEM
100 COMMUNICATION DEVICE (AT TRANSMITTING END)
110 ANTENNA (FIRST COMMUNICATION METHOD)
120 FIRST RADIO COMMUNICATION UNIT
150 STORAGE UNIT
160A~N ANTENNA (SECOND COMMUNICATION METHOD)
170 SECOND RADIO COMMUNICATION UNIT
200 COMMUNICATION DEVICE (AT RECEIVING END)
210 ANTENNA (FIRST COMMUNICATION METHOD)
220 FIRST RADIO COMMUNICATION UNIT
250 STORAGE UNIT
260A~N ANTENNA (SECOND COMMUNICATION METHOD)
270 SECOND RADIO COMMUNICATION UNIT

The invention claimed is:

1. A communication device comprising:
a first radio communication unit capable of radio communication, utilizing at least one antenna, in accordance with a first communication method; and
a second radio communication unit capable of radio communication, utilizing at least one antenna, in accordance with a second communication method using millimeter waves and which is different than the first communication method,
wherein
the first radio communication unit is configured to, upon receiving in accordance with the first communication method an instruction signal instructing to learn a beam directionality, determine a reception start time point of a beam reference signal based on the instruction signal,
the second radio communication unit starts reception, in accordance with the second communication method, of the beam reference signal from the reception start time point determined by the first radio communication unit and determines a parameter value for specifying an optimum beam pattern based on the received beam reference signal,
the millimeter waves used for radio communication by the second communication method are of higher frequency than frequencies used by the first communication method for radio communication,
the instruction signal contains information that specifies the reception start time point which is a time at which the second radio communication unit is to begin receiving the beam reference signal, and
the first radio communication unit and the second radio communication unit are each controlled by at least one processor.

2. The communication device according to claim 1, wherein
the reception start time point is a time point before completion of reception of the instruction signal by the first radio communication unit.

3. The communication device according to claim 2, wherein
the second radio communication unit notifies the determined parameter value to the first radio communication unit, and
the first radio communication unit transmits a notification signal containing the notified parameter value to a device from which the instruction signal is received.

4. The communication device according to claim 2, wherein
the second radio communication unit transmits a notification signal containing the determined parameter value to a device from which the instruction signal is received.

5. The communication device according to claim 1, wherein
the beam reference signal is a signal containing plural signal sequences respectively associated with different directionality patterns.

6. The communication device according to claim 5, wherein
the beam reference signal is a signal containing plural time slots respectively corresponding to the plural signal sequences, and
the parameter is a parameter for specifying at least one time slot of the plural time slots.

7. The communication device according to claim 5, wherein
the beam reference signal is a signal combining the plural signal sequences in orthogonal or pseudo orthogonal relation with one another, and
the parameter is a parameter for specifying at least one signal sequence of the plural signal sequences.

8. The communication device according to claim 1, wherein
the second radio communication unit determines an optimum directionality of a receiving beam by varying a directionality of the receiving beam during reception of the beam reference signal.

9. The communication device according to claim 1, wherein the first communication method uses microwaves.

10. The communication device according to claim 1, wherein the first communication method is based on a wireless local area network (LAN) standard.

11. A communication device comprising:
a first radio communication unit capable of radio communication, utilizing at least one antenna, in accordance with a first communication method; and
a second radio communication unit capable of radio communication, utilizing at least one antenna, in accordance with a second communication method using millimeter waves and which is different than the first communication method,
wherein
the first radio communication unit transmits, in accordance with the first communication method, an instruction signal instructing to learn a beam directionality to another communication device,
the second radio communication unit transmits, in accordance with the second communication method, a beam reference signal used for learning the beam directionality to said another communication device before completion of transmission of the instruction signal by the first radio communication unit,
the millimeter waves used for radio communication by the second communication method are of higher frequency than frequencies used by the first communication method for radio communication,
the instruction signal contains information that specifies a reception start time point which is a time at which the another communication unit is to begin receiving the beam reference signal in accordance with the second communication method, and
the first radio communication unit and the second radio communication unit are each controlled by at least one processor.

12. A communication control method between a transmitting device and a receiving device, the transmitting device and the receiving device performing radio communication therebetween in accordance with a first communication method and performing radio communication therebetween in accordance with a second communication method which is different than the first communication method, the communication control method comprising the steps of:
transmitting an instruction signal instructing to learn a beam directionality from the transmitting device to the receiving device in accordance with the first communication method;
transmitting a beam reference signal used for learning the beam directionality from the transmitting device to the receiving device in accordance with the second communication method;
starting reception, in accordance with the second communication method, of the beam reference signal from a certain reception start time point determined based on the received instruction signal that has been received by the receiving device in accordance with the first communication method; and
determining a parameter for specifying a beam having an optimum directionality based on the received beam reference signal in the receiving device,
wherein the second communication method uses millimeter waves for radio communication, and the millimeter waves used for radio communication by the second communication method are of higher in frequency than frequencies used by the first communication method for radio communication, and
wherein the instruction signal contains information that specifies the certain reception start time point which is a time at which the receiving device is to begin receiving the beam reference signal.

13. A communication system comprising a transmitting device and a receiving device respectively including:
a first radio communication unit capable of radio communication, utilizing at least one antenna, in accordance with a first communication method; and
a second radio communication unit capable of radio communication, utilizing at least one antenna, in accordance with a second communication method using millimeter waves and which is different than the first communication method,
wherein
the first radio communication unit of the transmitting device transmits, in accordance with the first communication method, an instruction signal instructing to learn a beam directionality to the receiving device,
the second radio communication unit of the transmitting device transmits, in accordance with the second communication method, a beam reference signal used for learning a beam directionality to the receiving device,
the first radio communication unit of the second device is configured to, upon receiving the instruction signal in accordance with the first communication method, determine a reception start time point of the beam reference signal based on the instruction signal,
the second radio communication unit of the receiving device starts reception, in accordance with the second communication method, of the beam reference signal from the determined reception start time point and determines a parameter value for specifying an optimum beam pattern based on the received beam reference signal,
the millimeter waves used for radio communication by the second communication method are of higher frequency than frequencies used by the first communication method for radio communication,
the instruction signal contains information that specifies the reception start time point which is a time at which the second radio communication unit of the receiving device is to begin receiving the beam reference signal, and the first radio communication unit and the second radio communication unit are each controlled by at least one processor.

14. The communication device according to claim 1, wherein the first communication method utilizes only one antenna, and the second communication method utilizes a plurality of antennas.

15. The communication device according to claim 14, wherein the plurality of antennas utilized in the second communication method are configured as MIMO antennas.

16. The communication device according to claim 15, wherein radio signals transmitted as a beam through the plurality of MIMO antennas are weighted in order to control a directionality of the transmitted beam.

* * * * *